United States Patent [19]

de Haan

[11] 4,188,638
[45] Feb. 12, 1980

[54] COLOR TELEVISION SIGNAL HAVING COLOR-DIFFERENCE SIGNALS ALTERNATING BETWEEN TWO CARRIERS

[75] Inventor: Maarten R. de Haan, Eindhoven, Netherlands

[73] Assignee: U.S. Philips Corporation, New York, N.Y.

[21] Appl. No.: 930,906

[22] Filed: Aug. 4, 1978

Related U.S. Application Data

[63] Continuation of Ser. No. 585,387, Jun. 9, 1975, abandoned.

[30] Foreign Application Priority Data

Apr. 22, 1975 [NL] Netherlands .......................... 7504733

[51] Int. Cl.² .......................... H04N 9/38; H04N 5/76
[52] U.S. Cl. .......................................... 358/4; 358/11; 358/15
[58] Field of Search .................... 358/4, 11, 12, 14, 15, 358/18, 44, 47, 23-25, 16

[56] References Cited

U.S. PATENT DOCUMENTS

| | | | |
|---|---|---|---|
| 3,162,838 | 12/1964 | Sauvanet | 358/14 |
| 3,267,208 | 8/1966 | Brouard | 358/14 |
| 3,893,163 | 7/1975 | Wessels et al. | 358/4 |
| 3,974,519 | 8/1976 | van den Bussche | 358/8 |

Primary Examiner—John C. Martin
Attorney, Agent, or Firm—Thomas A. Briody; William J. Streeter; Edward W. Goodman

[57] ABSTRACT

A transmission system for a color television signal, in particular a system for recording on and reproducing from a record carrier. The chrominance signal is divided into two separate color signals, which in a line-sequentially alternating fashion are modulated on two separate color carrier waves. The transmitted or recorded color television signal can simply be transformed into both a standard PAL and a standard SECAM signal. Owing to the line sequential alternation of the color signal, color errors which may arise owing to a mutual difference of the transfer characteristics for the two color signals are automatically compensated for in the case of reproduction via a PAL receiver.

12 Claims, 12 Drawing Figures

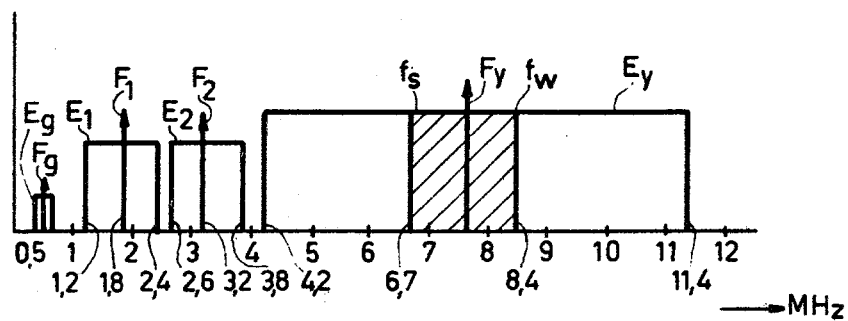
Fig. 1
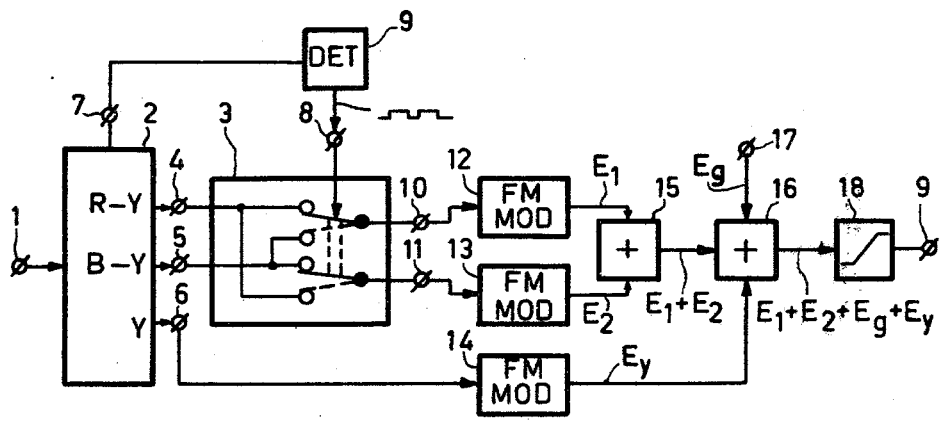
Fig. 2
Fig. 3

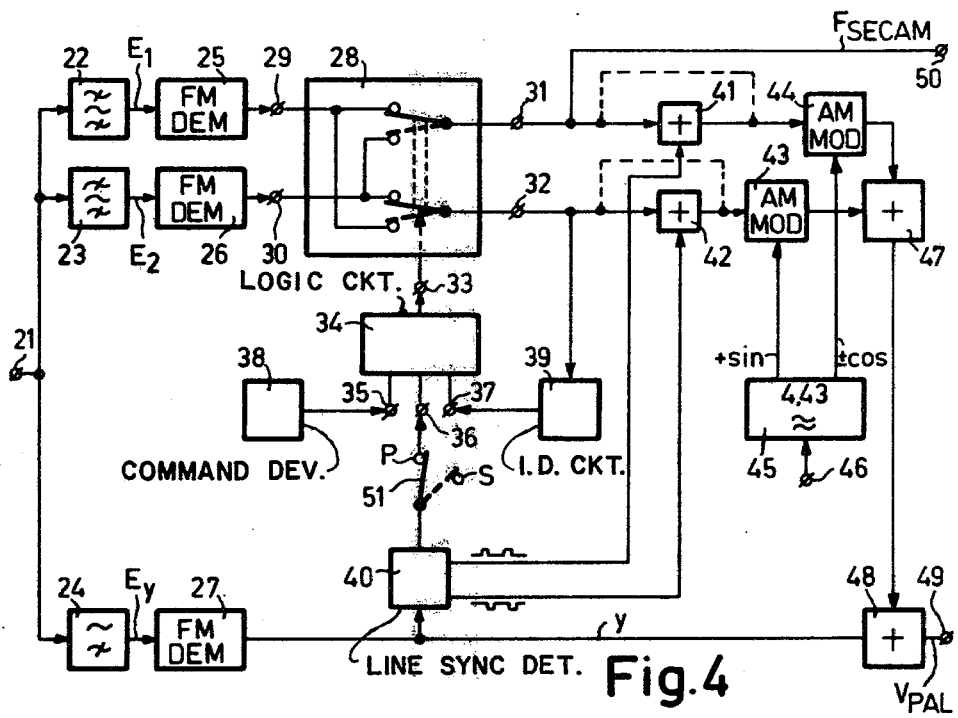
Fig.4
| $L_n$ | 29 | 30 | 31 | 32 | PAL ID | PAL chroma |
|---|---|---|---|---|---|---|
| n | $(R-Y)_1$ | $(B-Y)_2$ | $(R-Y)_1$ | $(B-Y)_2$ | $+\cos$ | $(\overline{B-Y})_2 + (\overline{R-Y})_1$ |
| n+1 | $(B-Y)_1$ | $(R-Y)_2$ | $(R-Y)_2$ | $(B-Y)_1$ | $-\cos$ | $(\overline{B-Y})_1 - (\overline{R-Y})_2$ |
| n+2 | $(R-Y)_1$ | $(B-Y)_2$ | $(R-Y)_1$ | $(B-Y)_2$ | $+\cos$ | $(\overline{B-Y})_2 + (\overline{R-Y})_1$ |
Fig.5
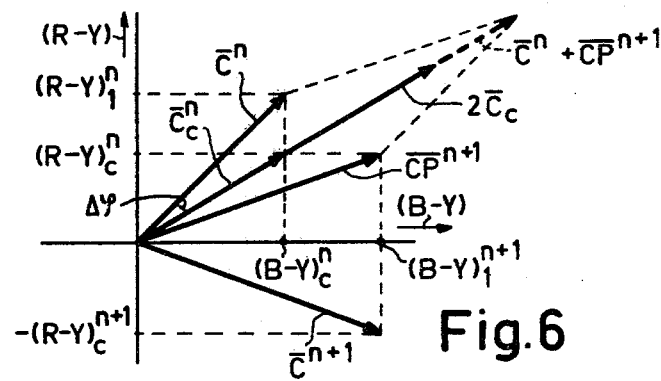
Fig.6

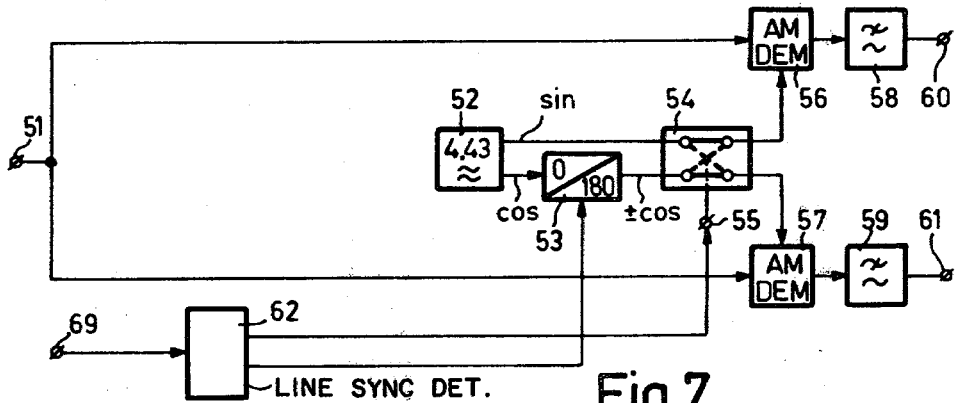
Fig.7
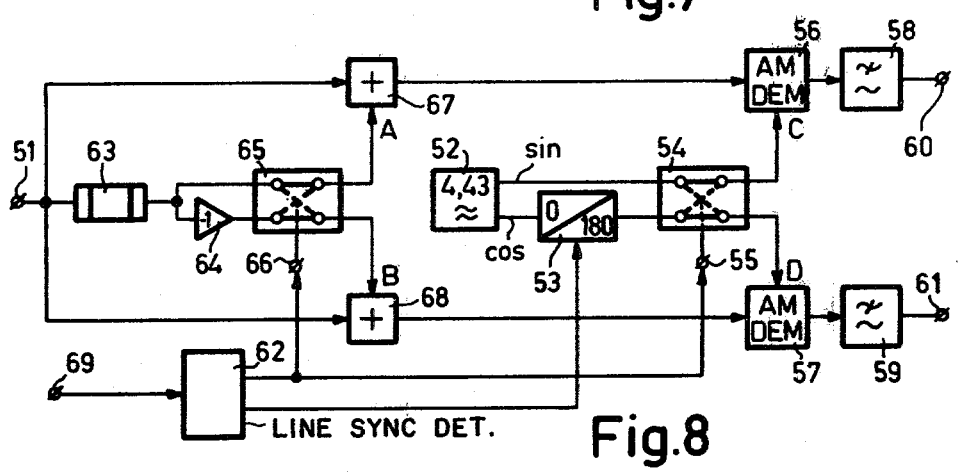
Fig.8
| Ln | 51 | A | B | 67 | 68 | C | D | 60 | 61 |
|---|---|---|---|---|---|---|---|---|---|
| 1 | $U_1+V_1$ | | | | | | | | |
| 2 | $U_2-V_2$ | $U_1+V_1$ | $-(U_1+V_1)$ | $U_1+U_2$ | $-(V_1+V_2)$ | sin | -cos | $(B-Y)_{12}$ | $(R-Y)_{12}$ |
| 3 | $U_3+V_3$ | $-(U_2-V_2)$ | $(U_2-V_2)$ | $V_2+V_3$ | $U_2+U_3$ | cos | sin | $(R-Y)_{23}$ | $(B-Y)_{23}$ |
| 4 | $U_4-V_4$ | $U_3+V_3$ | $-(U_3+V_3)$ | $U_3+U_4$ | $-(V_3+V_4)$ | sin | -cos | $(B-Y)_{34}$ | $(R-Y)_{34}$ |
| 5 | $U_5+V_5$ | $-(U_4-V_4)$ | $U_4+V_4$ | $V_4+V_5$ | $U_4+U_5$ | cos | sin | $(R-Y)_{45}$ | $(B-Y)_{45}$ |
Fig.9

| Lₙ | 41 | 42 | E | F | 43 | 44 | 47 |
|---|---|---|---|---|---|---|---|
| 1 | (R-Y) | (B-Y) | +cos | sin | +V | U | U+V |
| 2 | (B-Y) | (R-Y) | sin | -cos | U | -V | U-V |
| 3 | (R-Y) | (B-Y) | +cos | sin | +V | U | U+V |
| 4 | (B-Y) | (R-Y) | sin | -cos | U | -V | U-V |
| 5 | (R-Y) | (B-Y) | +cos | sin | +V | U | U+V |

COLOR TELEVISION SIGNAL HAVING COLOR-DIFFERENCE SIGNALS ALTERNATING BETWEEN TWO CARRIERS

This is a continuation of application Ser. No. 585,387, filed June 9, 1975, now abandoned.

The invention relates to a transmission system for a colour television signal, in particular to a system for recording on and reproducing from a record carrier, in which transmission system, in addition to a first signal component which contains the luminance information, a second signal component, which comprises a first colour carrier wave modulated with a first colour signal, and a third signal component which comprises a second colour carrier wave modulated with a second colour signal, are transmitted, said second and third signal components, occupying separate frequency bands.

Such a transmission system, which is for example known from Netherlands Patent Application No. 6.603.605, has the advantage that it is highly insensitive to timing errors introduced during transmission. This is of particular interest when a colour television signal is recorded on and reproduced from a record carrier, for example a magnetic tape or an optically readable video disk. In said systems timing errors are inter alia introduced by speed variations of the record carrier and in the case of the video disk also by the presence of the eccentricity. When in such recording systems the chrominance signal is recorded in known manner as a quadrature signal, i.e. on two 90° phase-shifted carrier waves of the same frequency, which are amplitude modulated with two colour signals, said timing errors will show up in the reproduced chrominance signal as a hue error, which is very disturbing.

In a transmission system mentioned in the preamble said timing errors have a far less disturbing effect, because the signals which are modulated on separate carrier waves, in particular frequency-modulated carrier waves, are substantially less sensitive to said timing errors than a quadrature-modulated signal as mentioned previously.

However, a drawback of a system as mentioned in the preamble is that it is very sensitive to variations in the transfer characteristic of the system. A variation in the transfer characteristic, which may result in the second and third signal component being no longer subject to the same transfer function, causes a hue error in the reproduced chrominance signal, which as previously stated, is highly disturbing.

It is an object of the invention to provide a transmission system of the type mentioned in the preamble, which mitigates said problem whilst the said advantages are maintained. For this, the invention is characterized in that the two colour signals which are added to the first and the second colour carrier wave are interchanged line-sequentially.

The step according to the invention first of all ensures that during the reproduction from a record carrier, which is provided with a colour television signal which is thus composed, an effective use is made of the averaging of the colour over two lines which is effected in a colour television receiver adapted for reproducing a colour television signal in accordance with the PAL standard. Owing to said averaging a possible hue error owing to mutual differences in the transfer characteristic for the second and third signal components is automatically compensated for. The same applies to differences in noise and bandwidth of the transmission channels for said second and third signal components. Moreover, it is achieved that the same record carrier can also be played via a playing apparatus adapted to the SECAM colour television system without said mutual differences in the transfer characteristic giving rise to hue errors.

Moreover, the system according to the invention is highly suited to be employed with pre-recorded record carriers, i.e. record carriers which have already been provided with a programme by the manufacturer. In this respect, the video disk, which at present is in the focus of interest, is an obvious application. Of course, it is of advantage when such a pre-recorded record carrier can be distributed as widely as possible. In Europe this presents the problem that two different colour television standards are being used, namely PAL and SECAM, so that a pre-recorded record carrier which is specifically adapted to either of said standards cannot be played without any further provisions in those areas where the other standard is used. The transmission system described is universal in this respect, because the second and third signal component may contain two elementary colour signals, from which with the aid of coding circuits in the playing equipment a colour television signal in accordance with the PAL or SECAM standard can simply be obtained. This means, that for the entire PAL-SECAM territory it suffices to use one and the same record carrier without this having any significant, particularly price-increasing consequences with respect to the playing equipment.

Finally, it has been found that the transmission system according to the invention is particularly advantageous in the case of said video disks, namely in the case of slow-motion or quick-motion reproduction of a recorded programme, which will be explained hereinafter.

The invention will now be described with reference to the Figures, in which

FIG. 1 shows a frequency spectrum of the transmitted television signal in a transmission system according to the invention, and FIG. 2 shows a diagram in explanation of said spectrum.

FIG. 3 shows a first embodiment of a recording or transmission apparatus, and

FIG. 4 shows a first embodiment of a reproducing or receiving apparatus for use in a system according to the invention, whilst FIGS. 5 and 6 show two diagrams to explain the operation.

FIGS. 7 and 8 show two alternative embodiments of the recording or transmission apparatus for use in a system according to the invention, and FIG. 9 shows a diagram to explain the operation thereof.

Figure 12:
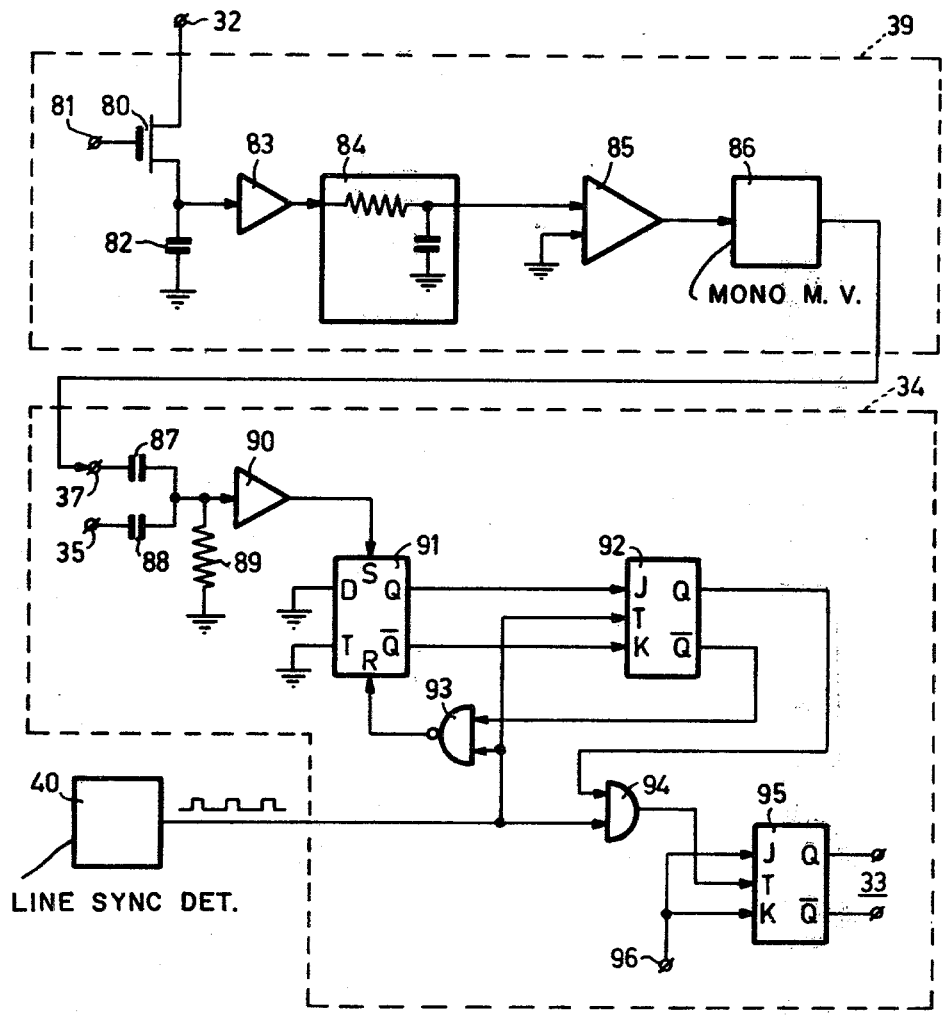

FIG. 12 finally shows an embodiment of the logic circuit applied on the reproducing apparatus according to the invention.

FIG. 1, by way of example, shows a frequency spectrum of a colour television signal as may be transmitted in accordance with the transmission system according to the invention. The luminance signal is added to a carrier wave $F_y$ as a frequency modulation and covers a frequency sweep of $f_s$ (synchronizing pulse) = 6.7 MHz to $f_w$ (peak white) = 8.4 MHz. It is assumed that the first signal component $E_y$, which in addition to said frequency sweep also contains the first-order sidebands, covers a bandwidth of 4.2–11.4 MHz. The frequency spectrum furthermore contains a second signal component $E_1$, which as a modulation of the first colour carrier wave $F_1$ contains a first colour signal, and a third signal component $E_2$, which as a modulation of a second colour carrier wave $F_2$ contains a second colour signal. Said second and third signal components occupy separate frequency bands, for example frequency bands of 1.2 MHz around the two carrier frequencies of 1.8 and 3.2 MHz respectively. For completeness a fourth signal component $E_g$ is shown, which consists of a carrier wave $F_g$ which is frequency modulated with the audio signal.

First of all, it is to be noted that the invention is by no means limited to the positions of the various signal components within the available bandwidth selected in FIG. 1. For the principle of the invention the location of said signal components within the frequency spectrum is of no importance at all. As an example, the second and third signal components may also be situated within the frequency band covered by the first signal component, as is for example described in Netherlands Patent Specification No. 106,695, or one of said signal components may be situated below and the other above the frequency band covered by said first signal component.

Furthermore, it is to be noted that the method of modulation of the first and second colour carrier $F_1$ and $F_2$ by the two colour signals is not essential for the step according to the invention. For example in this respect an amplitude modulation or a frequency modulation may be considered. For other reasons, inter alia the greater noise immunity, said colour carrier waves are preferably frequency-modulated, which is the reason why further in the description only this frequency-modulation will be discussed.

Finally, it is to be noted that the composition of the colour signals is not of direct importance, although the use of colour difference signal (R-Y) and (B-Y) is most advantageous. Therefore, said two colour difference signals (R-Y) and (B-Y) will be selected hereinafter as modulating signals for the two colour carrier waves $F_1$ and $F_2$.

In accordance with the step according to the invention the two signal components $E_1$ and $E_2$ no longer continuously contain the same colour signal, but these two colour signals are added to the two colour carrier waves $F_1$ and $F_2$ as a modulation signal in a line-sequentially alternating fashion. In FIG. 2 this is schematically represented for (R-Y) and (B-Y) colour signals which Figure as a function of the line number $L_n$ shows which colour signal is included in the second signal component $E_1$ and which colour signal in the third signal component $E_2$. This reveals that every alternate line the signal component $E_1$ comprises the two colour signals (R-Y) and (B-Y), and the signal component $E_2$ alternately contains the same colour signals but in phase opposition.

FIG. 3 shows a first embodiment of an apparatus, with which such a colour television signal can be obtained at the transmitter side or in the recording equipment for a record carrier. Said apparatus first of all comprises a transcoder 2, which splits a colour television signal which is applied to a terminal 1 into a luminance signal Y, and two colour difference signals (R-Y) and (B-Y). The circuit arrangement of said transcoder is of course determined by the composition of the colour television signal applied to the terminal 1. If said colour television signal is a signal composed in accordance with a standard (for example PAL) said transcoder 2 may for example correspond to the decoding device employed in receivers for the relevant standard colour television signal. However, any known transcoder which is capable of supplying the three designed signals (R-Y), (B-Y) and Y may be used.

The extracted luminance signal Y at terminal 6 is frequency modulated in an FM modulator 14, resulting in the first signal component $E_y$. The two colour components (R-Y) and (B-Y) are applied to the two input terminals 4 and 5 of a commutator 3. Said commutator 3 comprises a dual interlocked switch, which can assume two positions, viz. a first position in which a connection is established between the input terminal 4 and an output terminal 10 on the one hand, and an input terminal 5 and an output terminal 11 on the other hand, and a second position in which a connection is established between the input terminal 4 and the output terminal 11 on the one hand and the input terminal 5 and the output terminal 10 on the other hand. Said switch, which in practice will of course take the form of any known electronic switch, is controlled by a control signal at a control terminal 8 of the commutator 3. With the aid of a detector 9 said control signal is derived from the horizontal synchronizing pulses in the television signal, which are for example taken from an output terminal 7 of the transcoder 2, and which control signal is constituted by a symmetrical square-wave signal of half the line frequency. This ensures that the commutator 3 is controlled in such a way that at its output terminals 10 and 11 the colour signals (R-Y) and (B-Y) are available in phase opposition every alternate line, in accordance with the diagram of FIG. 2. The signal at terminal 10 is applied to a frequency modulator 12, in which said alternating colour signal is modulated on a carrier wave $F_1$, resulting in the second signal component $E_1$. The signal at terminal 11 is applied to a frequency modulator 13, in which said alternating colour signal is modulated on a carrier wave $F_2$, resulting in the third signal component $E_2$. Said second and third signal components $E_1$ and $E_2$ are summed with the aid of a summation device 15.

Said sum signal ($E_1+E_2$) should then moreover be combined with the first signal component $E_y$ and, as the case may be, a sound signal $E_g$, which is added to a carrier wave $F_g$ of for example 0.5 MHz as a frequency modulation, which signal is applied to a terminal 17. A simple method to achieve this is described in Netherlands Patent Application No. 7,212,003 (PHN 6510). In that case the signal components ($E_1+E_2$) and $E_g$ of comparatively low frequency are added to the first signal component $E_y$, which has finitely steep edges, and the sum signal ($E_y+E_1+E_2+E_g$) is applied to a limiter circuit 18. Thus, a square wave signal is obtained at the output terminal 19 whose frequency contains the luminance information and in which the colour sum signal ($E_1+E_2$) and the sound signal $E_g$ are contained as a pulse-width modulation, which signal is particularly suited to serve as a recording signal for an optically readable video disk.

FIG. 4 shows an embodiment of the receiving or reproducing equipment for a colour television signal which is thus transmitted or recorded. From the colour television signal applied to an input terminal 21, which signal is for example obtained from a video disk with the aid of an optical read system, the first signal component $E_y$ is extracted with the aid of a high-pass filter 24, from which the luminance signal Y is demodulated with the aid of an FM demodulator 27. The second and third signal components $E_1$ and $E_2$ are extracted with the aid of two band-pass filters 22 and 23, after which the colour signals are recovered from said signal components with the aid of two FM demodulators 25 and 26. Said colour signals are applied to the two input terminals 29 and 30 of a commutator 28. Said commutator is of the same design as the commutator 3 at the transmitter side, i.e. having two input terminals 29 and 30 and two output terminals 31 and 32 which are alternately interconnected as a function of a control signal at a control terminal 33. Said control terminal 33 receives a control signal from a logic circuit 34. Said logic circuit 34 has three input terminals 35, 36, 37, of which terminal 35 can receive a control signal from a command device 38, terminal 37 a control signal from an identification circuit 39, and terminal 36 a control signal from a detector 40 via a switch 51.

The function of the command device 38 and the identification circuit 39 will be described in more detail hereinafter. First of all, it will be indicated how the original continuous colour signal can be recovered with the aid of the commutator 28. For this purpose, the circuit 51 must be in the position P (PAL) in which position the horizontal synchronizing pulses which are detected from the luminance signal Y by the detector 40 reach the input terminal 36 of the logic circuit 34. In response to this said logic circuit 34 supplies a symmetrical square wave signal of half the line frequency to the control terminal 33 of the commutator 28, so that the position of the commutator switch is changed every line. The result of this is shown in the block diagram of FIG. 5.

Said FIG. 5 indicates for three consecutive lines n, n+1, n+2 of a television picture which colour signal is available at the inputs 29 and 30 and the outputs 31 and 32 of the commutator 28 during the relevant lines. The indexes near said colour information signals indicate via which signal components $E_1$ or $E_2$ said colour information has been transmitted. It is assumed that the input 29 of the commutator 28 receives the colour signal, which has been transmitted as a modulation of the first colour carrier $F_1$ and the input 30 receives the colour signal which has been transmitted as a modulation of the second colour carrier $F_2$. The two inputs 29 and 30 consequently receive the (R-Y) and (B-Y) colour signal every alternate line, but in mutual phase opposition.

When it is now assumed that during the line n the commutator 28 establishes the connection pattern represented by the continuous lines, the output 31 receives the $(R-Y)_1$ colour signal from input 29 during said line and the output 32 the $(B-Y)_2$ colour signal from input 30. During the next line the commutator establishes the connection pattern represented by the dashed lines and output 31 consequently receives the $(R-Y)_2$ colour signal from input 30 and output 32 the $(B-Y)_1$ colour signal from input 29. Consequently, the output 31 of the commutator 28 continuously supplies the (R-Y) colour signal, said colour signal being alternately obtained from FM demodulator 25 and 26 line-sequentially. In a similar way the output 38 now continuously supplies the (B-Y) signal.

In order to recover a standard colour signal in accordance with the PAL standard from said two colour difference signals (R-Y) and (B-Y) the two colour signals must be quadrature-modulated in known manner on a 4.43 MHz carrier wave. For this purpose, it may be desirable to add burst keying pulses to the two colour signals in two adder circuits 41 and 42. Said burst keying pulses may be derived from the horizontal synchronizing pulses detected by the detector 40 and serve for obtaining in known manner, the desired burst on the backporch of the horizontal flyback period in the case of modulation of the colour signals on the 4.43 MHz carrier. When said burst keying impulses have already been added to the colour signal at the transmitter side, said adder circuits 41 and 42 may be dispensed with, which in the Figure is indicated by the dashed connections between the outputs 31 and 32 of the commutator 28 and the AM-modulators 43 and 44. The desirability of generating said burst keying impulses in the receiving equipment depends on possible disturbances in the transmitted burst keying impulses. In this respect it is to be noted that in a PAL receiver also a certain compensation is obtained in respect of possible disturbances in said burst keying impulses owing to the averaging over two lines.

The colour signal (B-Y) provided with burst keying pulses is applied to a first amplitude modulator 43 which as carrier wave receives a 4.43 MHz signal of fixed phase (−sin) from an oscillator 45. The colour signal (R-Y) provided with burst keying pulses is applied to an amplitude modulator 44, which also receives a 4.43 MHz carrier wave signal from said oscillator 45, but which carrier wave is 90° phase-shifted relative to the carrier wave which is applied to the modulator 44 and which moreover exhibits a 180° phase alternation every other line (±cos). By adding the thus obtained two modulated colour signals in an adding circuit 47 a chrominance signal is obtained which is composed in accordance with the PAL standard and which is quadrature modulated. Said chrominance signal is added to the demodulated luminance signal Y in an adding circuit 48, so that at an output terminal 49 a PAL standard colour television signal becomes available, which may be applied to a standard PAL-colour television receiver.

In order to illustrate the effect of the step according to the invention reference is made again to FIG. 5 and the vector diagram shown in FIG. 6. The column PAL-ID in FIG. 5 indicates which PAL phase is added to the (R-Y) signal of the relevant line in the AM modulator 44, whilst the column PAL-chroma indicates the ultimate vectorial composition of the PAL chrominance signal of the relevant line.

When it is now assumed that owing to whatever cause the transfer characteristic of the second signal component $E_1$ has a higher gain factor than the transfer characteristic of the third signal component $E_2$, the colour signals $(B-Y)_1$ and $(R-Y)_1$ will always have too high a value compared with the colour signals $(B-Y)_2$ and $(R-Y)_2$. The effect of said difference in gain factor will be described with reference to FIG. 6.

For this it is assumed that the colour signal which is transmitted via the third signal component $E_2$ has the correct value. During the line n the $(B-Y)_2$ colour signal consequently has the desired value $(B-Y)_c{}^n$, the upper index indicating the relevant line. The $(R-Y)_1$ colour signal, however, is too great during said line n, i.e. greater than the desired signal $(R-Y)_c{}^n$. The result of this is that instead of the correct colour vector $$C_c{}^n = \overline{(B-Y)}_c{}^n + \overline{(R-Y)}_c{}^n$$

during said line n the colour vector $$\overline{C}^n = \overline{(B-Y)}_c{}^n + \overline{(R-Y)}_1{}^n$$

is obtained. Said colour vector $\overline{C}^n$ exhibits a phase error $\Delta\phi$ relative to the desired vector $\overline{C}_c{}^n$, which means that there will be a hue error, which is very disturbing.

Owing to the step according to the invention, however, the colour vector $\overline{C}^{n+1}$ during the line n+1 is composed of the $(B-Y)_1{}^{n+1}$ colour signal and $(R-Y)_2{}^{n+1}$ colour signal, the $(R-Y)_2$ signal now having the correct value $(R-Y)_c{}^{n+1}$, which for simplicity is assumed to be equal to $(R-Y)_{cn}$, and the $(B-Y)_1$ signal being too great relative to the desired value by the same factor, as was the case with the $(R-Y)_1$ signal during the line n. The colour vector $\overline{C}^{n+1}$ which corresponds to said line n+1 consequently consists of $\overline{C}^{n+1} = \overline{(B-Y)}_1{}^{n+1} - \overline{(R-Y)}_c{}^{n+1}$, the-sign being the result of the negative PAL phase (−cos) which prevails during said line n+1. In a PAL receiver, however, the vectorial sum of the two colour vectors of two consecutive lines is now determined during whilst previously the vector $\overline{C}^{n+1}$ which corresponds to the negative PAL-phase (−cos) is reflected relative to the (B-Y) axis, which sum vector is the ultimately reproduced colour signal. The vector $\overline{C}^{n+1}$ is consequently first reflected relative to the (B-Y) axis, resulting in a vector $\overline{CP}^{n+1}$, which vector is then vectorially added to the vector $\overline{C}^n$, which yields the vector $\overline{C}^n + \overline{CP}^{n+1}$. The Figure shows that said sum vector in respect of its phase is entirely correct compared with the desired colour vector $\overline{C}_c$, so that no hue error will result. The only error which remains is an error in the colour saturation, as said sum vector is greater than twice the desired colour vector $2\overline{C}_c$, but this is considerably less disturbing than a hue error.

The transmission system according to the invention moreover has additional advantages, which will be discussed in more detail with reference to the previously described embodiment of FIG. 4. It has already been stated that the transmission system according to the invention is particularly advantageous for pre-recorded record carriers, because in the reproducing apparatus a colour television signal suitable for a PAL receiver or for a SECAM receiver can be obtained in a very simple manner. The generation of a PAL colour television signal has already been described hereinbefore, so that this will not be discussed any further.

To obtain a SECAM colour signal it suffices to set the switch 51 to the position S. A SECAM colour signal comprises the (R-Y) and (B-Y) colour signal alternately from line to line. When switch 51 is set to the position S, the logic circuit 34 will no longer receive any horizontal synchronizing pulses from the detector 40, so that the control terminal 33 of the commutator 28 will not receive a control signal and the commutator switch remains in a fixed position. This means that the two outputs 31 and 32 are continuously connected to a fixed input 29 and 30. Thus, the (R-Y) and (B-Y) colour signals will occur line-sequentially at each of said two outputs. Consequently, a line-sequential colour signal $F_{SECAM}$ can be taken from one of said outputs, for example 31, which signal is available at an output terminal 50. To derive a complete SECAM colour television signal from this, said colour signal $F_{SECAM}$ should merely be modulated on the standard colour carriers and subsequently be added to the luminance signal Y. In order to simplify the block diagram this obvious step has not been further elaborated.

A further advantage of the transmission system according to the invention is in particular obtained when a disc is used as a record carrier, although it is also applicable to the use of a record carrier in the form of a tape. For further details on the use of an optically coded video disc as a record carrier, reference is made to U.S. Pat. No. 3,854,015. Generally, the video information is recorded on such a video disk in a spiral track, in such a manner that per revolution of said disk exactly one full television picture is recorded. In order to realize a stationary picture with the aid of such a video disk, it suffices to move the scanning spot with which the information is read one track pitch back after every revolution of said disk, so that each time the same television picture is reproduced. In the case of reproduction of a signal recorded in accordance with the PAL colour television standard this gives rise to a problem owing to the alternating phase of the PAL colour signal see Netherlands Patent Application No. 7,309,910 (PHN 7024). Since a television picture in accordance with the PAL standard contains 625 lines, the first and last line of a PAL colour television signal always have the same PAL phase. However, this means that when realizing a stationary picture the line-sequential alternation of said PAL phase is always interrupted at the beginning of the picture, so that the reproduced colour signal may be disturbed.

When using the transmission system according to the invention this presents no problem, as the alternating PAL phase is not added to the colour signal until in the read apparatus, namely during the modulation of the (R-Y) colour signal on the standard chrominance carrier (4, 43 MHz) with alternating phase (±cos) in the modulator 44. However, in order to continuously maintain the (R-Y) colour signal at the output 31 of the commutator 28 in the case of a stationary picture, the commutator switch should perform an extra switching cycle upon every revolution of the video disk. The first and the last line of one and the same recorded television picture contain the same colour signal, for example (R-Y), owing to the odd number of lines, so that without additional switching the output 31 would contain the (R-Y) colour signal during one picture period, the (B-Y) colour signal during the next picture period etc. Owing to the additional change-over of the commutator switch at picture frequency, this is prevented.

Said additional change-over can be accomplished very simply with the aid of the command device 38. Said command device 38 will already be provided in the read equipment and control the desired movements of the scanning spot for realizing of said stationary picture. Consequently, it is very simple to cause said command device 38 to apply an additional pulse to the input 35 of the logic circuit 34 during each return of the scanning spot, so that said logic circuit 34 will supply an additional changing pulse to the commutator 28. It will be evident that everything that has been said in respect of stationary pictures also applies to other deviating reproducing speeds, such as slow-motion or reverse-motion pictures.

FIG. 4 finally shows an identification circuit 39. Said identification circuit 39 serves to ascertain in the case of PAL reproduction whether output 31 of the commutator actually carries the (R-Y) colour signal and output 32 the (B-Y) colour signal. Should these be interchanged owing to an incorrect alternation phase of the commutator switch, said identification circuit 39 with the aid of an identification signal which is included in the video signal, for example burst keying pulses, supplies an additional pulse to an input 37 of the logic circuit 34, so that the commutator switch performs an additional change-over. When the transmitted burst keying pulses are used as identification signal, and if the disturbance-free burst keying pulses are to be added, erase circuits should be included before the adding circuits 41 and 42 in order to erase the transmitted burst keying pulses.

FIGS. 7 and 8 show two alternative embodiments of an apparatus with which a PAL-standard colour television signal can be transformed into a colour television signal as transmitted with the system according to the invention.

For the apparatus of FIG. 7 it has been assumed that the chrominance component of the colour television signal according to the PAL-standard is applied to an input terminal 51. Said chrominance signal consequently contains a quadrature-modulated chrominance signal on a 4.43 MHz colour carrier. In order to derive the two colour signal (R-Y) and (B-Y) from this, an oscillator 52 is provided which supplies two carrier waves, derived from the colour burst, with a frequency of 4.43 MHz, but which are mutually 90° phase shifted (sin and cos). One of said carrier waves is applied to a phase inverter 53 which line-sequentially changes the phase of the carrier wave by 180°. Said phase alternating carrier wave ($\pm$cos) and the fixed carrier wave (sin) from the oscillator 52 are applied to two inputs of a commutator 54, whose outputs are respectively connected to two amplitude demodulators 56 and 57, to which the original chrominance signal from terminal 51 is applied. In a similar way as the phase inverter 53, said commutator 54 receives a control signal at its control input 55 from a detector 62, which detects the line pulses from the luminance information of the PAL colour television signal applied to a terminal 69, so that both the phase inverter and the commutator are switched line-sequentially, whilst via said detector 62 it is assured that the phase inverter 53 assumes the correct position in accordance with the PAL phase of the applied chrominance signal.

When it is assumed that the commutator 54 is in the position represented by the continuous line, the (B-Y) colour signal is derived at the output of the AM demodulator 56, which via a low-pass filter 58 becomes available at a terminal 60. At the output of AM demodulator 57 the (R-Y) colour signal is obtained simultaneously, which signal becomes available at a terminal 61 via a low-pass filter 59. During the next line via the commutator 54 the cos-signal of the 4.43 MHz carrier is applied to the AM demodulator 56, so that at terminal 60 the (R-Y) colour signal is obtained, whilst at the same time the (B-Y) colour signal becomes available at terminal 61. Thus, at the two terminals 60 and 61 the two desired colour signals (R-Y) and (B-Y) become alternately available line-sequentially to be transmitted via separate frequency bands by modulating them on two different colour carriers $F_1$ and $F_2$.

FIG. 8 shows a second embodiment of an apparatus for obtaining the desired colour signals from a PAL-standard chrominance signal for the transmission system according to the invention. Corresponding elements are denoted by the same reference numerals as in FIG. 7. The PAL-chrominance signal is again applied to an input terminal 51, which is now connected to a delay line 63, which delays said chrominance signal by one line period. The delayed chrominance signal is applied both directly and via an inverter 64 to the two inputs of a commutator 65, which at its control input 66 receives a symmetrical squarewave signal which is supplied by the line pulse detector 62; so that said commutator is changed over line-sequentially.

In order to explain the operation of said apparatus reference is made to the block diagram of FIG. 9. Said diagram shows the signals which appear at different points of the apparatus for five consecutive lines $L_n$. The PAL chrominance signal at terminal 51 is represented as U+V and U−V alternately so as to denote the alternating PAL phase, U being the (B-Y) colour signal modulated on 4.43 MHz, and V being the (R-Y) colour signal modulated on 4.43 MHz. The indexes now denote the line during which said chrominance signal is applied. The output signals A and B of the commutator 65 will contain the chrominance signal which has been delayed by one line period, the polarity changing every line owing to the inverter 64. The output signal A is added to the undelayed chrominance signal in an adding circuit 67, resulting in the chrominance signal indicated in column 67, and the signal B is added to said undelayed chrominance signal in an adding circuit 68, resulting in the signal indicated in column 68, in which it is assumed that the colour components of the two consecutive lines differ only slightly. From these two columns 67 and 68 it can be seen that at the outputs of the two adding circuits 67 and 68 only one colour component is present. Apart from the commutator 65, said circuit is in fact identical to the circuit generally used in PAL receivers for averaging phase errors.

The chrominance signals supplied by the adding circuits 67 and 68 are applied to the AM demodulators 56 and 57 respectively, which also receive the carrier waves C and D respectively, which with the aid of a phase inverter 53 and commutator 54 are derived from an oscillator 52 in an identical manner as shown in FIG. 7. This results in the colour signals indicated in the columns 60 and 61 at the terminals 60 and 61. It can be seen that the desired colour sequence is obtained again at the two terminals. The difference with the device shown in FIG. 7 is that the colour signal which becomes available during a specific line, for example (B-Y)$_{12}$ is the average of the colour signals (B-Y)$_1$ and (B-Y)$_2$, i.e. each time the two colour signals of two consecutive lines. Of course, this is the result of the use of the delay line 63. The advantage of the device of FIG. 8 compared with that of FIG. 7 is the requirements to be imposed on the AM demodulators 56 and 57 will be less stringent.

Figures 10, 11:
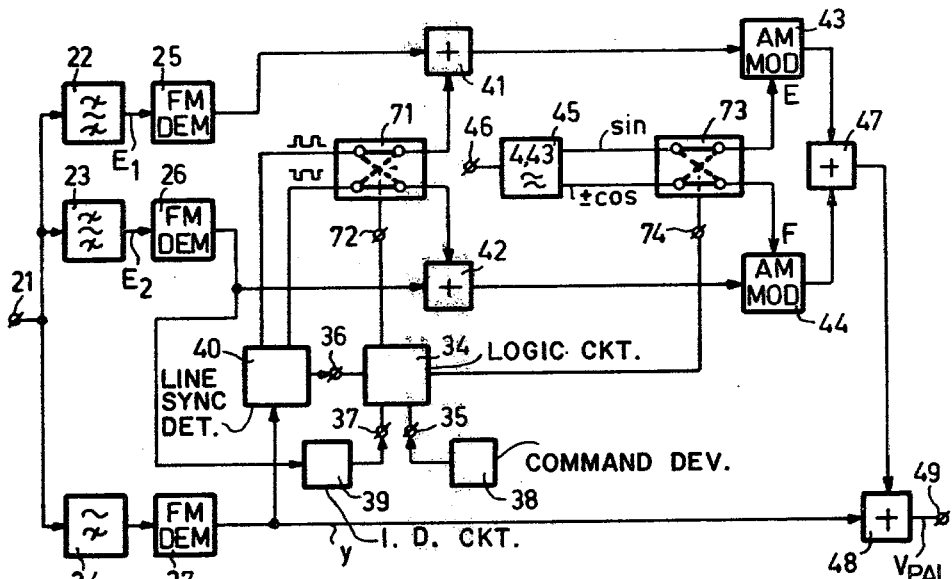
FIG. 10 shows an alternative embodiment of the reproducing or receiving apparatus for use in a system according to the invention, whilst
FIG. 11 shows a diagram pertaining thereto.

FIG. 10 shows an alternative embodiment of a reproducing apparatus for the transmission system according to the invention, the signals which appear being shown in the diagram of FIG. 11. Corresponding elements are denoted by the same reference numerals as in FIG. 4. The colour television signal which has been read is again divided into the signal components $E_1$, $E_2$ and $E_y$ with the aid of band-pass filters 22 and 23 and a low-pass filter 24. Said signal components are demodulated with the aid of FM demodulators 25, 26 and 27. At the outputs of the two FM demodulators 25 and 26 the line-sequentially alternating colour signals (R-Y), (B-Y) etc. are obtained again. To these two colour signals the burst keying pulses are now added in the adding circuits 41 and 42. As to the alternating colour signals (R-Y) and (B-Y) keying pulses of opposite polarity applied to a commutator 71 is required, whose two outputs are connected to the adding circuits 41 and 42 and whose two inputs are connected to the line pulse detector 40, which supplies both keying pulses of positive polarity and keying pulses of negative polarity which are locked to the detected line pulses in the luminance signal y to said commutator 71. Via a control input 72 said commutator 71 is controlled by the logic circuit 34, which in its turn receives a control signal from the detector 40.

Thus, always the correct burst-keying pulses are added to the demodulated colour signals. These two colour signals provided with keying pulses, at the outputs of the two adding circuits 41 and 42 (columns 41 and 42 in FIG. 11) are then applied to the two AM modulators 43 and 44. To these two AM modulators two carrier waves E and F with a frequency of 4.43 MHz are applied, whose phase is line sequentially switched. This is again effected with the aid of a 4.43 MHz oscillator 54 which supplies two 90° phase-shifted carrier waves (sin and cos), whilst one of said carriers moreover changes polarity line-sequentially (±cos). These two carrier wave signals are applied to a commutator 73, which at its control input 74 receives a control signal from the logic circuits 34 and thus changes over line sequentially. As a result, the colour signals (R-Y) and (B-Y) are always modulated on a carrier wave of the correct phase. At the output of the two AM modulators line-sequentially alternating colour signals are still obtained, but they are now modulated on carrier waves with a frequency of 4.43 MHz and are therefore represented by U and V in an analogy with FIG. 9. By adding said two colour signals in an adding circuit 47 a chrominance signal (column 47 in FIG. 11) is obtained which fully complies with the PAL standard and which when added to the luminance signal y in adding circuit 48 yields a complete PAL colour television signal $V_{PAL}$ at the output terminal 40.

Finally, FIG. 12 schematically shows an embodiment of the logic circuit 34 together with the identification circuit 39. The identification circuit 39 for example receives the colour signal from output 32 of the commutator 28 (see FIG. 4). Said signal is applied to a switching transistor 80, which at its control electrode 81 receives such pulses, derived from the horizontal synchronizing pulses, that said switching transistor is conducting during the time intervals in which the colour signal at output 32 contains the transmitted burst keying pulses. These transmitted burst keying pulses are applied to a capacitance 82. As is known, the keying pulses which are added to the (R-Y) colour signal are positive and the keying pulses which are added to the (B-Y) colour signal are negative. Depending on the colour signal which is present at the output 32 the voltage across the capacitance 82 will consequently be positive or negative. Via an amplifier 83 and an integrator 84 with an integration time of, for example, 200 line periods, said voltage is transferred to an input of a comparator 85, whose second input is connected to earth potential. Said comparator for example has a preferred position which corresponds to a negative input signal, which in its turn corresponds to the presence of the (R-Y) colour signal at the output 32 of the commutator 28. However, if the switching phase of said commutator 28 should not be correct and the (B-Y) colour signal should consequently appear at the output 32, the signal which is applied to the comparator 85 becomes positive, so that said comparator changes over. With the aid of a monostable multivibrator 86 a suitable pulse is then applied to the terminal 37 of the logic circuit 34.

Said logic circuit 34 furthermore comprises a terminal 35, which is connected to the command device 38. The two terminals 35 and 37, via a differentiating network which consists of the capacitances 87 and 88 and the common resistor 89, are coupled to an amplifier 90, which supplies a pulse of the desired duration as soon as one of said terminals 35 and 37 receives a pulse. The logic circuit 34 further comprises a D flip-flop 91, whose set input S is connected to the amplifier 90. The outputs Q and $\overline{Q}$ of said D flip-flop are connected to the J and K inputs of a JK flip-flop 92. The Q output of said JK flip-flop is connected to an input of an AND-gate 94 and the $\overline{Q}$-output to an input of an NAND-gate 93. At their other inputs these two gates 93 and 94 receive the line-synchronizing pulse train supplied by the detector 40, which is also applies to the T input of the JK flip-flop 92. The output of the gate 93 is connected to the reset input R of the D flip-flop 91 and the output of the gate 94 to the T input of a JK flip-flop 95. The J and K inputs of said JK flip-flop 95 are connected to a common terminal 96, whilst the signals at either of the two outputs Q and $\overline{Q}$ may be used as switching signals for the commutator 28.

The operation of the circuit is as follows. By feedback via the gate 93 to the reset input R of the D flip-flop 91 a stable state is obtained in which a logic 1 appears at the Q output and a logic 0 at the $\overline{Q}$ output of flip-flop 91. As a result, a logic 1 and 0 are also present at the Q and $\overline{Q}$ output respectively of the JK flip-flop 92. The AND-gate 94 in this state consequently transfers the line-synchronizing pulses train from detector 40 to the T input of the JK flip-flop 95. In the event that the colour signal which is applied to the reproducing apparatus is to be transformed into a standard PAL signal, a logic 1 is applied to terminal 96, so that as a result of the line-synchronizing pulse train at the T input, the logic level of the two outputs Q and $\overline{Q}$ changes line-sequentially, so that the position of the commutator is also switched line-sequentially.

When subsequently one of the terminals 35 or 37 receives a pulse, the set input S of the D flip-flop receives a pulse and the state of said D flip-flop changes, i.e. the Q output supplies a logic 0 and the $\overline{Q}$ output a logic 1. As these two outputs are connected to J and K inputs of the JK flip-flop, the state of said JK flip-flop also changes upon the next line synchronizing pulse at the T input. The Q output then supplies a logic 0 to the AND-gate 94, so that the second, subsequent line synchronizing pulse from detector 40 is not transferred to the R input of the JK flip-flop 95 and said flip-flop does not switch over its output signals. As the $\overline{Q}$ output of the JK flip-flop 92 supplies a logic 1 to the NAND-gate 93, said second line synchronizing pulse is applied to the reset input R of the D flip-flop, so that after said second line synchronizing pulse the stable state is restored.

A pulse at one of the terminals 35 and 37 thus eventually ensures that the line-sequentially alternating control signals which becomes available at the outputs of the JK flip-flop 95 for the commutator 28 are maintained in one state during two line periods, so that said commutator 28 remains in the same state during these two line periods, which yields the desired phase inversion of the commutation. It follows that the phase inversion of the commutation mentioned in the introduction of the specification is to be understood to include both the omission of a change-over prescribed by the line-synchronizing pulse train and the performance of an extra commutation, for example during the vertical flyback period.

It is obvious that the embodiment of the logic circuit is by no means limited to the embodiment shown. Various modifications are also conceivable in respect of the modulation method in which the three signal components are recorded on a record carrier. Obviously, said modulation method is not essential for the principle of the invention. For the purpose of illustration reference is made to the applicant's previous Netherlands Patent Application Nos. 7,412,634 and 7,413,004.

What is claimed is:

1. A transmission apparatus for a color television signal, said apparatus comprising an output terminal, means for applying to said terminal a first signal component having the luminance information of said color television signal, first and second modulator means for respectively applying second and third color signal components having first and second color carrier frequencies respectively to said terminal, said second and third components occupying separate frequency bands, and means for line sequentially interchangeably applying to said modulators first and second color signals of said color television signal.

2. A transmission apparatus as claimed in claim 1, wherein the first and second colour signals comprise colour difference signals.

3. A transmission apparatus as claimed in claim 1, wherein said interchangeably applying means comprises a first commutator means having a first and a second input and a first and second output for establishing as a function of a control signal in a line sequentially alternating fashion a parallel and crosswise coupling between said first and second input and said first and second output for obtaining the second and the third signal components in two separate colour channels coupled to said modulator means respectively.

4. A transmission apparatus as claimed in claim 3, wherein the first input of the first commutator receives the first colour signal and the second input receives the second colour signal, the first output being coupled to said first modulator means for modulating an applied signal on the first colour carrier wave, and the second output being coupled to said second modulator means for modulating an applied signal on the second colour carrier wave.

5. A transmission apparatus as claimed in claim 3, wherein said colour television signal is in accordance with the PAL standard, and further comprising means for providing that the first input of the first commutator receives a carrier wave of a frequency equal to that of the chrominance sub-carrier wave of the standard colour television signal, and that the second input receives a carrier wave which has the same frequency as the carrier wave applied to said first input and which relative to said carrier wave exhibits a line-sequential +90° and −90° phase alternation, a first amplitude demodulator coupled to receive both the carrier wave which appears at the first output of the first commutator and a first chrominance signal which is derived from the PAL colour television signal, and a second amplitude demodulator coupled to receive the carrier wave which appears at the second output of the first commutator and a second chrominance signal derived from the PAL colour television signal, the output signal of the two amplitude demodulators being applied to the two separate colour channels.

6. A transmission apparatus as claimed in claim 5, wherein the first and the second chrominance signal comprise the complete chrominance signal contained in the PAL colour television signal.

7. A transmission apparatus as claimed in claim 5, further comprising a first adding circuit means for supplying the first chrominance signal and a second adding circuit means for supplying the second chrominance signal, a delay means with a delay time which equals one line period of the television signal, said delay means having an input means for receiving the chrominance component contained in the PAL colour television signal and an output, an inverter circuit means coupled to the output of the delay means for inverting the output thereof, control circuit means for providing a control signal, a second commutator means for establishing in a line-sequential alternating fashion as a function of said control signal a parallel and crosswise coupling between a first and a second input and a first and a second output, the first input being coupled to the output of the delay means, the second input being coupled to the output of the inverter circuit, the first output being coupled to a first input of the first adding circuit, the second output being coupled to a first input of the second adding circuit, and wherein said first and second adding circuits each comprises a second input means for receiving the chrominance component contained in the PAL colour television signal.

8. A receiving apparatus comprising a commutator means having a first and a second input and a first and second output for establishing as a function of a control signal in a line-sequentially alternating fashion a parallel and a crosswise coupling between said first and second input and said first and second output, the two inputs being coupled to two individual colour channels in which color signal components derived from the same scanning line of a color television signal appear in line sequentially alternating fashion between said channels, the outputs being coupled to two separate output channels, and logic circuit means for supplying as a function of a horizontal synchronizing signal which is applied to a first input thereof a squarewave control signal to said commutator for line sequentially changing the coupling which is established by the commutator between the two inputs and the outputs.

9. A receiving apparatus as claimed in claim 8, further comprising an indentification circuit means having at least a first input coupled to one of the output channels for detecting which colour signal appears in the relevant output channels and for supplying in the event that the incorrect colour signal is detected a pulse to a second input of the logic circuit for causing a phase inversion of the alternation of the coupling between the two inputs and the two outputs of the commutator.

10. A receiving apparatus as claimed in claim 8 for use in reproducing a colour television signal which is recorded on a disc-shaped record carrier, the apparatus further comprising a command device means coupled to an input of the logic circuit for causing a phase inversion of the alternation of the coupling between the two inputs and the two outputs of said commutator so as to maintain the PAL phase-alternation in the case of a playing sequence of the recorded television images which differs from the recording sequence.

11. A receiving apparatus comprising a first demodulator means for demodulating a colour signal which is modulated on a first colour carrier wave, a second demodulator means for demodulating a colour signal which is modulated on a second colour carrier wave, said color signals comprising components of a color television signal which line sequentially alternate between said carrier waves, a first and a second amplitude modulator means coupled to said demodulators respectively to individually receive the two colour signals for modulating said colour signals on two carrier waves which exhibit a mutual line-sequential +90° and −90° phase alternation, an oscillator means for supplying two carrier waves of the same frequency which exhibit a mutual +90° and −90° line-sequential phase alternation, and a first commutator means with two inputs coupled to said oscillator and two outputs coupled to said modulators respectively for establishing as a function of a control signal in a line-sequentially alternating fashion a parallel and crosswise coupling between said two inputs and the two outputs so that the two carrier waves of the oscillator can be applied alternately to the two amplitude modulators, and a logic circuit means for controlling said commutator.

12. A receiving apparatus as claimed in claim 11, further comprising a first and a second adding circuit coupled between said demodulators and modulators respectively and a second commutator means having two outputs coupled to the individual adding circuits for applying burst keying pulses thereto and two inputs to receive two pulse trains of line frequency, one of said inputs receiving pulses of positive polarity and the other input pulses of negative polarity, the logic circuit means also controlling said second commutator for establishing in a line-sequentially alternating fashion a parallel and crosswise coupling between the two inputs and the two outputs thereof.

* * * * *